US012699444B2

(12) United States Patent
Wang et al.

(10) Patent No.: US 12,699,444 B2
(45) Date of Patent: Aug. 4, 2026

(54) BEAM WALKING DETECTION FOR EYE TRACKING IN A HEAD-MOUNTED DEVICE

(71) Applicant: Meta Platforms Technologies, LLC, Menlo Park, CA (US)

(72) Inventors: Youmin Wang, Bellevue, WA (US); Gaetano Aiello, Redmond, WA (US); Robert Dale Cavin, Bellevue, WA (US); Yatong An, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 383 days.

(21) Appl. No.: 18/369,089

(22) Filed: Sep. 15, 2023

(65) Prior Publication Data
US 2025/0093950 A1     Mar. 20, 2025

(51) Int. Cl.
| | |
|---|---|
| *G06F 3/00* | (2006.01) |
| *G01J 1/04* | (2006.01) |
| *G02B 27/01* | (2006.01) |
| *G06F 3/01* | (2006.01) |

(52) U.S. Cl.
CPC ............ *G06F 3/013* (2013.01); *G01J 1/0414* (2013.01); *G01J 1/0429* (2013.01); *G02B 27/0172* (2013.01); *G02B 2027/0178* (2013.01)

(58) Field of Classification Search
CPC ....... G06F 3/013; G01J 1/0414; G01J 1/0429; G02B 27/0172; G02B 2027/0178; G02B 27/0093; A61B 3/1025; A61B 3/12; A61B 3/1233; A61B 3/1241; A61B 3/14; A61B 3/145

USPC .......................................................... 351/206
See application file for complete search history.

(56) References Cited

U.S. PATENT DOCUMENTS

| | | | |
|---|---|---|---|
| 6,867,753 B2 | 3/2005 | Chinthammit et al. | |
| 10,154,254 B2 | 12/2018 | Trail | |
| 10,832,051 B1 | 11/2020 | Trail et al. | |
| 11,079,601 B2 * | 8/2021 | Greenberg | G02B 27/0179 |
| 11,238,598 B1 | 2/2022 | Hall et al. | |
| 2023/0163449 A1 * | 5/2023 | Choi | H01Q 1/48 |
| | | | 343/718 |

OTHER PUBLICATIONS

Clarke A.H., et al., "Using High Frame Rate CMOS Sensors for Three-Dimensional Eye Tracking," Behavior Research Methods, Instruments, & Computers, Nov. 2002, vol. 34, No. 4, pp. 549-560.

* cited by examiner

*Primary Examiner* — Henry Duong
(74) *Attorney, Agent, or Firm* — Greenberg Traurig, LLP

(57) ABSTRACT

An eye tracking system for a head-mounted device determines depth characteristics of an eye in an eyebox region. The eye tracking system includes a detector array, a scanning mirror, and a light source. The detector array is oriented on the head-mounted device to receive reflected light from an eyebox region of the head-mounted device. The scanning mirror is optically coupled between the eyebox region and the detector array. The scanning mirror is configured to rotate to direct the reflected light from a plurality of locations within the eyebox region to the detector array. The light source configured to provide pulses of light to illuminate at least part of the eyebox region.

20 Claims, 5 Drawing Sheets

200

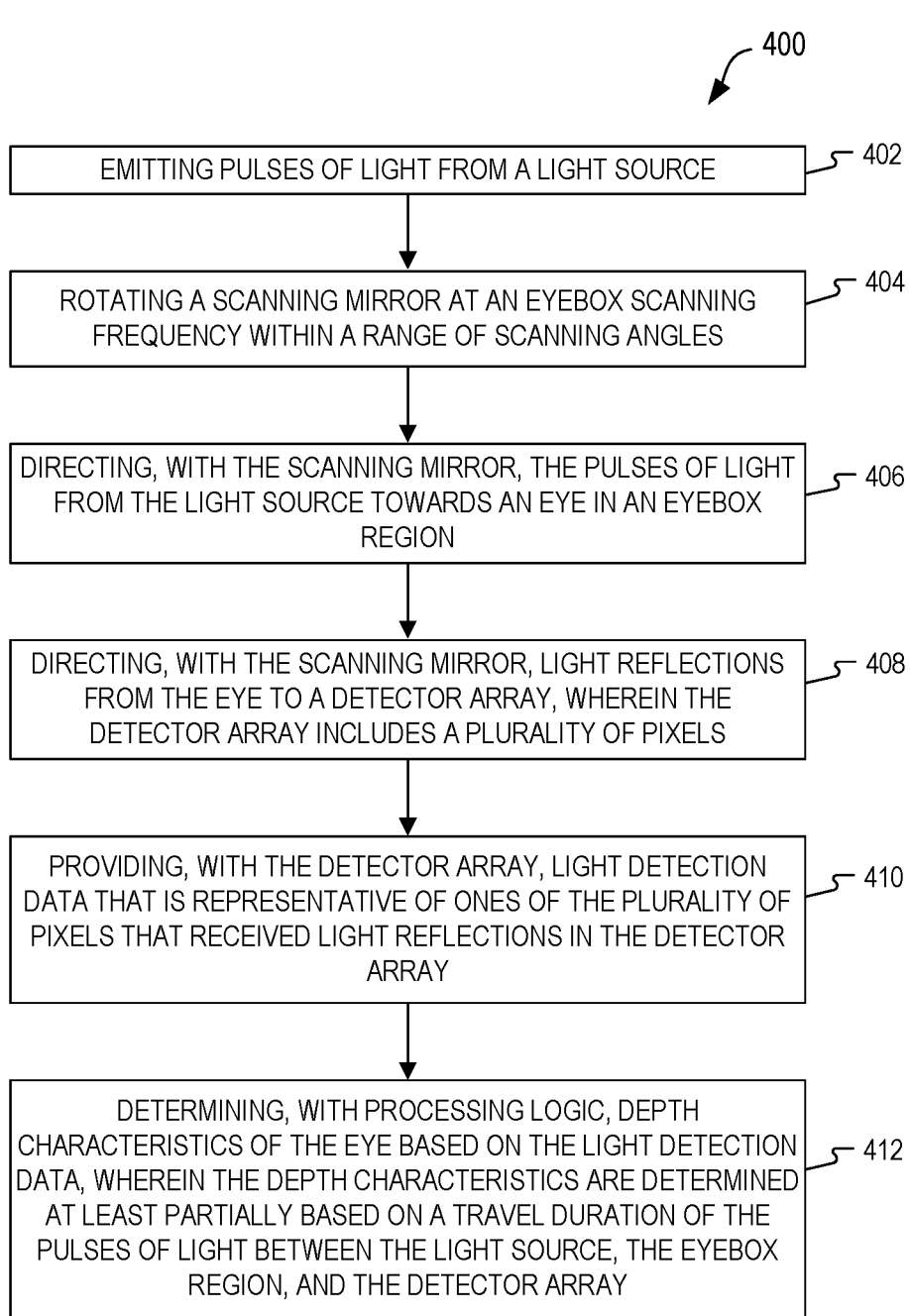

400

EMITTING PULSES OF LIGHT FROM A LIGHT SOURCE    402

ROTATING A SCANNING MIRROR AT AN EYEBOX SCANNING FREQUENCY WITHIN A RANGE OF SCANNING ANGLES    404

DIRECTING, WITH THE SCANNING MIRROR, THE PULSES OF LIGHT FROM THE LIGHT SOURCE TOWARDS AN EYE IN AN EYEBOX REGION    406

DIRECTING, WITH THE SCANNING MIRROR, LIGHT REFLECTIONS FROM THE EYE TO A DETECTOR ARRAY, WHEREIN THE DETECTOR ARRAY INCLUDES A PLURALITY OF PIXELS    408

PROVIDING, WITH THE DETECTOR ARRAY, LIGHT DETECTION DATA THAT IS REPRESENTATIVE OF ONES OF THE PLURALITY OF PIXELS THAT RECEIVED LIGHT REFLECTIONS IN THE DETECTOR ARRAY    410

DETERMINING, WITH PROCESSING LOGIC, DEPTH CHARACTERISTICS OF THE EYE BASED ON THE LIGHT DETECTION DATA, WHEREIN THE DEPTH CHARACTERISTICS ARE DETERMINED AT LEAST PARTIALLY BASED ON A TRAVEL DURATION OF THE PULSES OF LIGHT BETWEEN THE LIGHT SOURCE, THE EYEBOX REGION, AND THE DETECTOR ARRAY    412

FIG. 4

BEAM WALKING DETECTION FOR EYE TRACKING IN A HEAD-MOUNTED DEVICE

TECHNICAL FIELD

This disclosure relates generally to eye tracking, and in particular to 3D eye depth sensing.

BACKGROUND INFORMATION

Head-mounted displays (HMDs) provide utility and entertainment to a wide range of users. To improve the user experience (UX), some HMDs attempt to track a user's eye movement or position. Better eye tracking features may enable the HMD to provide more immersive, user-friendly, and enjoyable UX.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 4 illustrates a flow diagram of a process of eye tracking with a head-mounted device, in accordance with aspects of the disclosure.

DETAILED DESCRIPTION

Figure 1A:
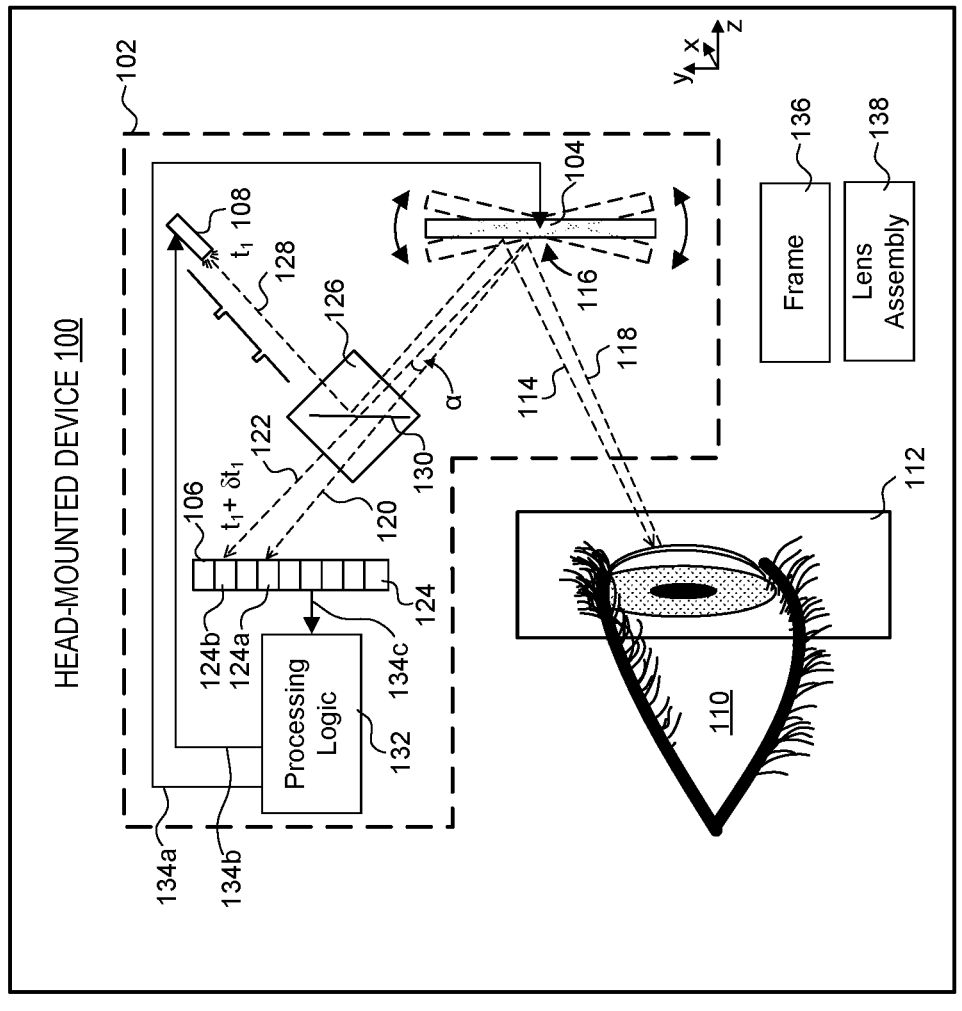
FIGS. 1A and 1B illustrate diagrams of head-mounted devices that support beam walking detection for eye tracking, in accordance with aspects of the disclosure.

Embodiments of systems and methods for beam walking detection for eye tracking in a head-mounted device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

In aspects of this disclosure, the term "transparent" may be defined as having greater than 90% transmission of light. In some aspects, the term "transparent" may be defined as a material having greater than 90% transmission of visible light.

In aspects of this disclosure, beam walking may be defined as an angular offset or displacement in a light ray, where the angular offset or displacement is caused by being reflected off of a rotating surface (e.g., a scanning mirror). Beam walking may cause a light ray to become incident upon a one portion (e.g., pixel) of a detector array instead of another portion (e.g., pixel) of the detector array.

For high-speed eye tracking applications, three-dimensional (3D) depth sensing can be used to enhance gaze tracking accuracy and reliability.

In accordance with aspects of the disclosure, an eye tracking system uses pulse detection for range estimation to acquire a 3D depth profile of an eye. A pulse is emitted by a light source towards an eyebox region, and the eye reflects the pulse for capture by a detector array. Using the traveling time of the pulse, the distance between the light source (or a scanning mirror) and the eye can be estimated. Since the depth resolution for eye tracking is usually on the order of a few hundreds of microns, high-speed analog-to-digital converters (ADCs) would be needed to digitize the returning pulse and differentiate the peak in time domain. Unfortunately, high-speed ADCs are often costly, with limited resolution, and can also induce higher noise due to the high bandwidth of the entire system. Furthermore, reducing the bandwidth of ADCs will result in the increase of time quantization error and the degradation of distance measurement accuracy. The disclosed eye tracking system uses a scanner (e.g., a scanning mirror) to convert the measurement of a pulse from time domain to spatial domain, thus eliminating the requirement for high-speed ADCs for eye tracking.

An eye tracking system for a head-mounted device determines depth characteristics of an eye in an eyebox region, in accordance with aspects of the disclosure. The eye tracking system includes a detector array, a scanning mirror, a light source, and processing logic. The detector array is oriented on the head-mounted device to receive reflected light from the eyebox region. The detector array includes a number of pixels configured to convert light into electricity. The detector then provides light detection data to the processing logic for eye orientation determination.

The scanning mirror is optically coupled between the eyebox region and the detector array. The scanning mirror may be implemented as a micro-electromechanical system (MEMS) device. The scanning mirror is configured to rotate to direct the reflected light from a plurality of locations within the eyebox region to the detector array. Because of beam walking, the reflected light will be directed to pixels on the detector array based on: the scan rate (e.g., 10 kHz) of the scanning mirror, the scan direction, and the distance between the eye and the scanning mirror.

The processing logic is coupled to the light source, scanning mirror, and detector array. The processing logic strobes the light source to provide pulses of light to illuminate at least part of the eyebox region. Light pulses may be sent at a rate of 1 GHz, without overlapping. The processing logic may cause the scanning mirror to rotate at 10 kHz to 100 kHz over a range of 50-70°, for example. The processing logic may receive light detection data from the detector array and may use the light detection data to determine a depth profile and an orientation of a user's eye.

Advantageously, unlike a high-speed ADC architecture that directly operates in time domain, the disclosed use of a scanning mirror transforms the reflected light measurement from a time domain into spatial domain, according to an embodiment. This transformation may reduce the system bandwidth. The sampling rate can be as low as the pulse rate. For example, for a time domain resolution to be 1 ns (~15 cm object distance resolution), the bandwidth of the system would be ~1 GHz in the conventional time-domain operation mode. By contrast, the electrical bandwidth of direct time of flight systems are often less than 1 MHz. The bandwidth of the disclosed detector array or position sensitive device (PSD) based eye tracking system can be significantly reduced. As a trade-off, the quantization resolution of ADCs is significantly higher (e.g., 32-bit @ 1 MHz vs. 10-bit @ 1 GHz), which is achievable and more economical.

The apparatus, system, and method for beam walking detection for eye tracking in a head-mounted device that are described in this disclosure include may improve the accuracy of detection of the position, orientation, and/or motion of an eye in an eye tracking system, according to an embodiment. These and other embodiments are described in more detail in connection with FIGS. 1A-5.

FIG. 1A illustrates a diagram of a head-mounted device 100 that supports beam walking detection for eye tracking, in accordance with embodiments of the disclosure. Head-mounted device 100 includes an eye tracking system 102 that uses a scanning mirror, a light travel duration, and a beam (walking) displacement to determine dimensions, position, orientation, and/or movement of an eye, according to an embodiment. A head-mounted device, such as head-mounted device 100, is one type of smart device. In some contexts, head-mounted device 100 is also a head-mounted display (HMD) that is configured to provide artificial reality. Artificial reality is a form of reality that has been adjusted in some manner before presentation to the user, which may include, e.g., virtual reality (VR), augmented reality (AR), mixed reality (MR), hybrid reality, or some combination and/or derivative thereof.

Eye tracking system 102 includes a number of components that are configured to support beam walking detection for eye depth sensing to support eye tracking operations, in accordance with aspects of the disclosure. Eye tracking system 102 may include a scanning mirror 104, a detector array 106, and a light source 108, according to an embodiment. Scanning mirror 104 may be configured to rotate about one or two axes to illuminate eye 110 along 1D (one-dimension) or 2D (two-dimensions) within an eyebox region 112, according to an embodiment. Scanning mirror 104 may be configured to rotate at a rate of 10 kHz to 100 kHz for an angle of up to 50-60°, according to an embodiment. Rotating at, for example, 10 kHz and 50-60° may enable eye tracking system 102 to provide an optical resolution of 0.1-0.2° while scanning eyebox region 112, according to an embodiment. Scanning mirror 104 may be implemented as a micro-electromechanical system (MEMS) device. Scanning mirror 104 may be configured to redirect incoming light ray 114 across a surface area of an eye 110 that is located within eyebox region 112, according to an embodiment. Scanning mirror 104 may be configured to redirect incoming light ray 114 along an x-axis and/or a y-axis to enable eye tracking system 102 to determine depth characteristics (e.g., a 3D model) for eye 110 along the x-axis, the y-axis, and a z-axis, according to an embodiment. Scanning mirror 104 may include a reflective surface 116 that directs incoming light ray(s) 114 towards eyebox region 112. Reflective surface 116 may also be configured to direct reflected light ray 118 towards detector array 106, according to an embodiment.

Detector array 106 is configured to receive various reflected light rays (e.g., reflected light ray 118) that have been redirected by scanning mirror 104, according to an embodiment. If scanning mirror 104 were stationary, reflected light ray 118 might be directed toward a first pixel 124$a$ as a light ray 120. However, reflected light ray 118 is reflected with an additional offset that causes light beam walking, which is an angular displacement of reflected light ray off of reflective surface 116. While scanning mirror 104 is rotating, reflected light ray 118 might be directed toward a second pixel 124$b$ as light ray 122. Light ray 122 may have an angular displacement $\alpha$ from light ray 120, and the angular displacement $\alpha$ may be based on the angular velocity @ of scanning mirror 104 and a light travel duration of the light rays from light source 108 to detector array 106, according to an embodiment. The rotating function of scanning mirror 104 enables depth sensing of a large area/volume of eyebox region 112. Determination of the angular displacement by, for example, processing logic 132, enables eye tracking system 102 to map illuminated pixels with locations on the eye and with distance (depth) to the eye.

The depth or distance to eye 110 increases and decreases the light travel duration of light rays, which may also determine which pixel(s) receives light in detector array 106. Light source 108 is strobed to emit pulses of light to distinguish light rays received by detector array 106. An emitted light 128 leaves light source 108 at a first time $t_1$, and light ray 122 is received by detector array 106 at a second time $(t_1 + \delta_1)$. Second time $(t_1 + \delta t_1)$ is first time $t_1$ plus light travel duration $\delta t_1$. Light travel duration $\delta t_1$ varies based on the surface profile of eye 110 and based on the rotational orientation of scanning mirror 104. A shorter light travel duration $\delta t_1$ at a particular pixel and at a particular rotation orientation may be associated with a closer portion of eye 110 (e.g., cornea or cornea peak), and a longer light travel duration $\delta t_1$ at the particular pixel and at the particular rotation orientation may be associated with a farther portion of eye 110 (e.g., sclera or base of cornea), according to an embodiment. Thus, light travel duration $\delta t_1$ may be also used to perform depth sensing of eye 110, according to an embodiment.

Detector array 106 may include a number of pixels 124 (e.g., first pixel 124$a$, second pixel 124$b$, etc.), according to an embodiment. Although the term pixel is used, pixels 124 may be implemented as photo-sensitive diodes or another photo-sensitive component or material. Detector array 106 is a 1D (one-dimension) of pixels 124, according to one embodiment. Pixels 124 are photosensitive and convert photons into electricity. Pixels 124 enable eye tracking system 102 to map 3D characteristics (e.g., position, motion, radius, orientation) of eye 110, according to an embodiment. Detector array 106 may generate light data or image data that is representative photons from reflected light rays 120 and 122 that are incident upon pixels 124. Detector array 106 may be implemented as a single-photon avalanche diodes (SPAD) camera, a high-speed camera, a position-sensitive device (PSD), with digital detection, or with analog detection, according to various embodiments.

Light source 108 is configured to be strobed to selectively emit pulses of light to support scanning the eyebox region 112, according to an embodiment. The pulses of light may be emitted successively so each pulse may be distinguished from subsequent pulses. The pulse width may be less than a nanosecond. Light source 108 may include one or more of light emitting diodes (LEDs), photonic integrated circuit (PIC) based illuminators, micro light emitting diode (micro-LED), an edge emitting LED, a superluminescent diode (SLED), a vertical cavity surface emitting laser (VCSEL), or another type of laser, in accordance with various implementations. Light source 108 may provide emitted light rays 128 as non-visible spectrum light (e.g., infrared light). Light source 108 may be oriented to indirectly illuminate scanning mirror 104 to support scanning eyebox region 112, according to an embodiment. Light source 108 may be oriented to directly illuminate scanning mirror 104 to support scanning eyebox region 112, according to an embodiment.

Eye tracking system 102 may also include a beam splitter 126 to align emitted light 128 to be coaxial with reflected light rays 118, 120 and 122, in accordance with aspects of the disclosure. Beam splitter 126 may be a polarization beam splitter or a 50:50 beam splitter. Beam splitter 126 may have an optical element 130 (e.g., a coated surface, a diffractive element, etc.) that reflects light of a first polarization (e.g., vertical polarization) and transmits light of a second polarization (e.g., horizontal polarization). Optical element 130 may be a 50:50 surface that reflects 50% of emitted light 128 and transmits 50% of reflected light rays 118. Optical element 130 may be configured to operate (e.g., selectively reflect and selectively transmit) on non-visible light (e.g., infrared light).

Eye tracking system 102 includes processing logic 132 that is communicatively coupled to scanning mirror 104, detector array 106, and light source 108, in accordance with aspects of the disclosure. Processing logic 132 controls scanning mirror 104 to rotate along an x-axis, a y-axis, or both, to selectively illuminate eyebox region 112 with light, according to an embodiment. Processing logic 132 may determine an angular deviation a between returning light rays 120 and 122. Process logic 132 uses angular deviation a to determine depth characteristics, orientation, and/or position of eye 110, according to an embodiment. Angular deviation a may be defined in Equation 1 as:

$$\alpha = 2 * \omega * \delta t_1, \qquad \text{(Equation 1)}$$

where $\omega$ is the angular velocity of scanning mirror 104, and $\delta t_1$ is the light travel duration between light source 108 and detector array 106 for the pulse emitted at time $t_1$. Angular velocity $\omega$ defines the rotation rate that scanning mirror 104 uses to direct light to and from eyebox region 112. The use of scanning mirror 104 in eye tracking system 102 transforms the measurement of pulses from the time domain into the spatial domain ($\delta t_1 \rightarrow \alpha$), which reduces system bandwidth, enables faster sampling (e.g., 1 GHZ), and enables use of cheaper components (e.g., a high-speed camera instead of high-speed ADCs), according to an embodiment.

If detector array 106 is implemented as a PSD, processing logic 132 may employ a different equation or algorithm to determine angular deviation a, according to an embodiment. A PSD is an analog component that may be used to detect light. If the signal given by two detectors (e.g., pixels in the array) is current $I_1$ and current $I_2$, then processing logic 132 may use the value of $(I_2-I_1)/(I_1^2+I_2^2)$ with a look-up table to find $\alpha$. The reflected light pulse intensity may be determined by $(I_1+I_2)$.

Processing logic 132 controls light source 108 and receives light data from detector array 106, in accordance with aspects of the disclosure. Processing logic 132 may provide control signals to light source 108 to strobe light source 108 to emit pulses of emitted light 128. The pulses of emitted light 128 may be provided successively—one after another—without overlapping, which can reach approximately 1 GHz (i.e., a billion pulses per second). Light travel time $\delta t_1$ may be determined by processing logic 132 by, for example, measuring the time delay between providing a control signal to light source 108 and receipt of light data from detector array 106, according to an embodiment. Processing logic 132 may also determine a distance $d_{total}$ between light source 108 and detector array 106 based on measuring the time delay between providing a control signal to light source 108 and receipt of light data from detector array 106, according to an embodiment. Since processing logic 132 includes pre-existing knowledge of the pulse control signal and light emission time, the speed of light c ($2.99 \times 10^8$ m/s) can be used to determine the distance $d_{total}$ between light source 108 and detector array 106. For example, the light travel duration $\delta t_1$ multiplied by the speed of light c provides the distance $d_{total}$ traveled by the emitted light 128 from light source 108 to detector array 106. Any time delays associated with getting the control signal to light source 108 and associated with receiving light data from detector array 106 may be compensated for by processing logic 132, according to an embodiment. Processing logic 132 may control components and receive light data over various communication channels 134a, 134b, 134c (collectively, communication channels 134).

Head-mounted device 100 may include a frame 136 and a lens assembly 138. The various components of eye tracking system 102 may be positioned and distributed around various locations of frame 136 and/or lens assembly 138 of head-mounted device 100, in accordance with aspects of the disclosure.

Figure 1B:
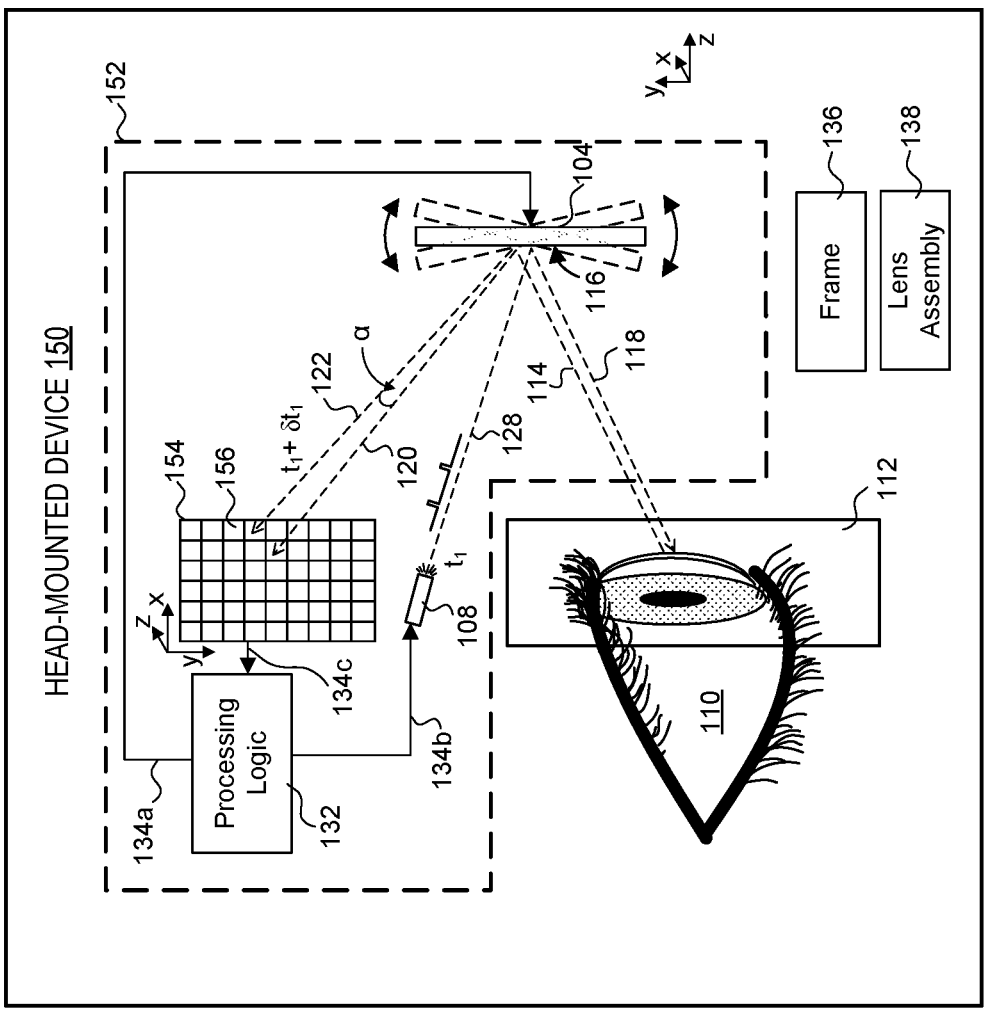

FIG. 1B illustrates a diagram of a head-mounted device 150 that supports beam walking detection for eye tracking, in accordance with aspects of the disclosure. Head-mounted device 150 includes an eye tracking system 152. Eye tracking system 152 includes a 2D detector array 154 positioned to receive reflected light ray 122 with pixels 156 that are arranged along an x-axis and a y-axis. 2D detector array 154 enables detection of reflected light along multiple axes, which may enable detection of light that is redirected by scanning mirror 104 along two axes, according to an embodiment.

Figure 2:
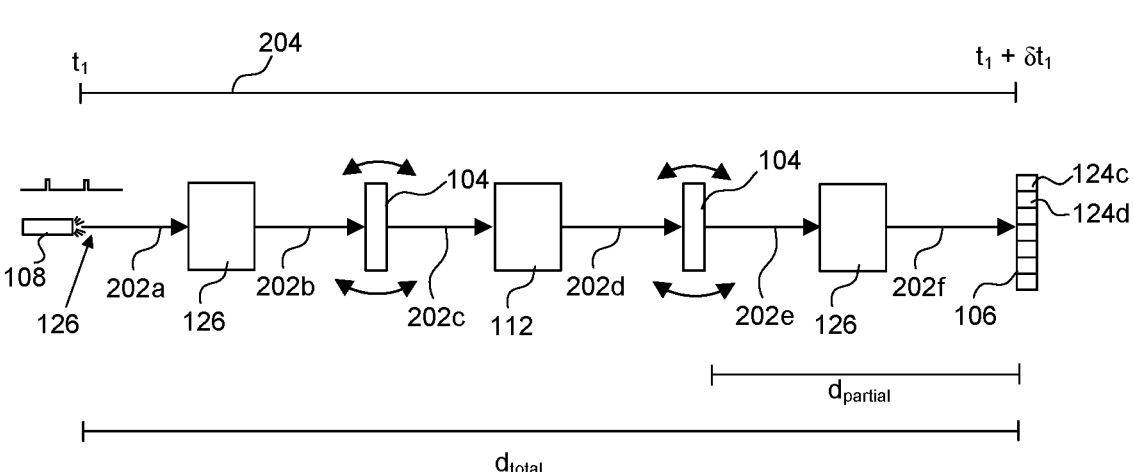
FIG. 2 illustrates a diagram of a light path for eye tracking operations, in accordance with aspects of the disclosure.

FIG. 2 illustrates a diagram 200 of a light path 202 for eye tracking operations, in accordance with aspects of the disclosure. Light path 202 includes a light path segment 202a of emitted light 128, according to an embodiment. Light path segment 202a extends between light source 108 and beam splitter 126. Light path 202 may include a light path segment 202b that extends between beam splitter 126 and scanning mirror 104. Light path 200 may include a light path segment 202c that extends between scanning mirror 104 and eyebox region 112. Light path 202 includes a light path segment 202d that extends from eyebox region 112 to scanning mirror 104, according to an embodiment. Light path 202 includes a light path segment 202e that extends between scanning mirror 104 and beam splitter 126, according to an embodiment. In some implementations, the eye tracking system may exclude a beam splitter or may include direct illumination, and light path segment 202e may extend to detector array 106, according to an embodiment. Light path 202 includes a light path segment 202f that extends between beam splitter 126 and detector array 106, according to an embodiment.

As illustrated by timeline 204, emitted light 128 may be emitted as a pulse of light from light source 108 at time $t_1$. Light travel duration $\delta t_1$ for emitted light 128 is the duration of travel of emitted light 128 along light path 202 from light source 108 to detector array 106, according to an embodiment. Accordingly, a total distance $d_{total}$ of light path 202 may have a propagation time that is equal to travel duration $\delta t_1$. Because a proportional relationship exists between the angular displacement $\alpha$ and light travel duration $\delta t_1$ (e.g., Equation 1), the angular displacement $\alpha$ may be calculated to determine an offset between an illuminated pixel and a particular location on an eye. Travel duration $\delta t_1$ may be measured or may be calculated based on measurements of angular displacement $\alpha$, according to an embodiment.

Characteristics of detector array 106 may be determined based on light travel time $\delta t_1$, according to an embodiment. For example, the portion of light travel duration $\delta t_1$ to travel the distance $d_{partial}$ (e.g., between scanning mirror 104 and detector array 106) may be combined (e.g., multiplied) to determine a pitch (e.g., a distance between center points) of adjacent pixels (e.g., pixels 124c and 124d), according to an embodiment.

Figure 3:
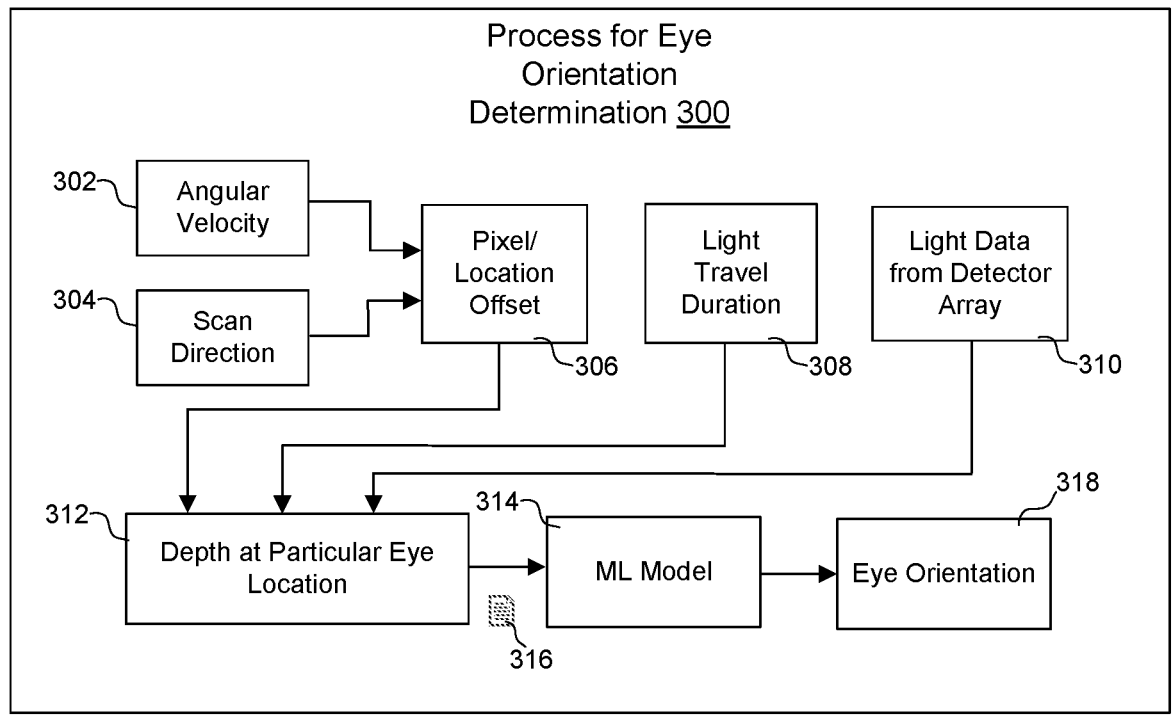
FIG. 3 illustrates a diagram of a process for eye orientation determination in an eye tracking system, in accordance with aspects of the disclosure.

FIG. 3 illustrates a diagram of a process 300 for eye orientation determination in an eye tracking system (e.g., eye tracking system 102, shown in FIG. 1A), in accordance with aspects of the disclosure.

At operation block 302, processing logic (e.g., processing logic 132, shown in FIG. 1) for the eye tracking system determines an angular velocity ω of the scanning mirror, according to an embodiment. The processing logic may set angular velocity ω to be in the range of 10 kHz to 100 kHz. The processing logic may also determine a range of angles of operation of the scanning mirror, such as 50-60°, to provide an optical resolution of 0.1-0.2°, for example.

At operation block 304, processing logic determines a scan direction of the scanning mirror at a particular time, according to an embodiment. The scan direction may be along a single axis (e.g., the x-axis) or may be along two axes, in accordance with embodiments of the disclosure.

At operation block 306, processing logic for the eye tracking system may determine a pixel/location offset, according to an embodiment. The pixel/location offset may be an offset or location difference between a pixel on the detector array and a location in the eye box region. Pixels on the detector array may be offset from locations in the eyebox region based on the angular velocity ω of the scanning mirror and based on the scan direction, according to an embodiment.

At operation block 308, processing logic may determine a light travel duration (e.g., light travel duration $\delta t_1$), according to an embodiment. The light travel duration may be defined as a duration for which emitted light travels along a light path from a light source to a detector array in the eye tracking system, according to an embodiment.

At operation block 310, processing logic may receive light data from the detector array, according to an embodiment. Light data may represent one or more pixels that are illuminated by light that is reflected from the eyebox region and that becomes incident upon the detector array.

At operation block 312, processing logic may determine a depth at a particular eye location, according to an embodiment. The depth may be defined as a distance between the detector array and a particular location on the user's eye. As different locations, portions, or regions of an eye are scanned, the distance between the detector array and the eye will vary (e.g., based on the surface profile of the eye). Processing logic determines the depth at a particular eye location based on the pixel/location offset, the light travel duration (e.g., the distance), and the light data from detector array, according to an embodiment.

At operation block 314, processing logic applies eye depth data 316 to a machine learning (ML) model, according to an embodiment. The machine learning model may be trained based on scans of eyes and/or scans of models of eyes, according to various embodiments. The machine learning model may output the likelihood of an eye being in a particular orientation or position.

At operation block 318, processing logic determines an eye orientation based on, for example, the output of the machine learning model, according to an embodiment. The eye tracking system may provide the eye orientation to a controller of a head-mounted device. The head-mounted device may use the eye orientation to customize, improve, display, or adjust UX elements (e.g., text, buttons, images, etc.), in accordance with aspects of the disclosure.

FIG. 4 illustrates a flow diagram of a process 400 for determining eye position with an eye tracking system of a head-mounted device, in accordance with aspects of the disclosure. Process 400 may be at least partially incorporated into or performed by an eye tracking system 102 (shown in FIG. 1A), according to an embodiment. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

At process block 402, process 400 emits pulses of light from a light source, according to an embodiment. Process block 402 proceeds to process block 404, according to an embodiment.

At process block 404, process 400 rotates a scanning mirror at an eyebox scanning frequency within a range of scanning angles, according to an embodiment. The eyebox scanning frequency may include 10 kHz to 100 kHz, and the range of scanning angles may include 50-70°, for example. Process block 404 proceeds to process block 406, according to an embodiment.

At process block 406, process 400 directs, with the scanning mirror, the pulses of light from the light source towards an eye in an eyebox region, according to an embodiment. Process block 406 proceeds to process block 408, according to an embodiment.

At process block 408, process 400 directs, with the scanning mirror, light reflections from the eye to a detector array, wherein the detector array includes a plurality of pixels, according to an embodiment. Process block 408 proceeds to process block 410, according to an embodiment.

At process block 410, process 400 provides, with the detector array, light detection data that is representative of ones of the plurality of pixels that received light reflections in the detector array, according to an embodiment. Process block 410 proceeds to process block 412, according to an embodiment.

At process block 412, process 400 determines, with processing logic, depth characteristics of the eye based on the light detection data, wherein the depth characteristics are determined at least partially based on a travel duration of the pulses of light between the light source, the eyebox region, and the detector array, according to an embodiment.

Figure 5:
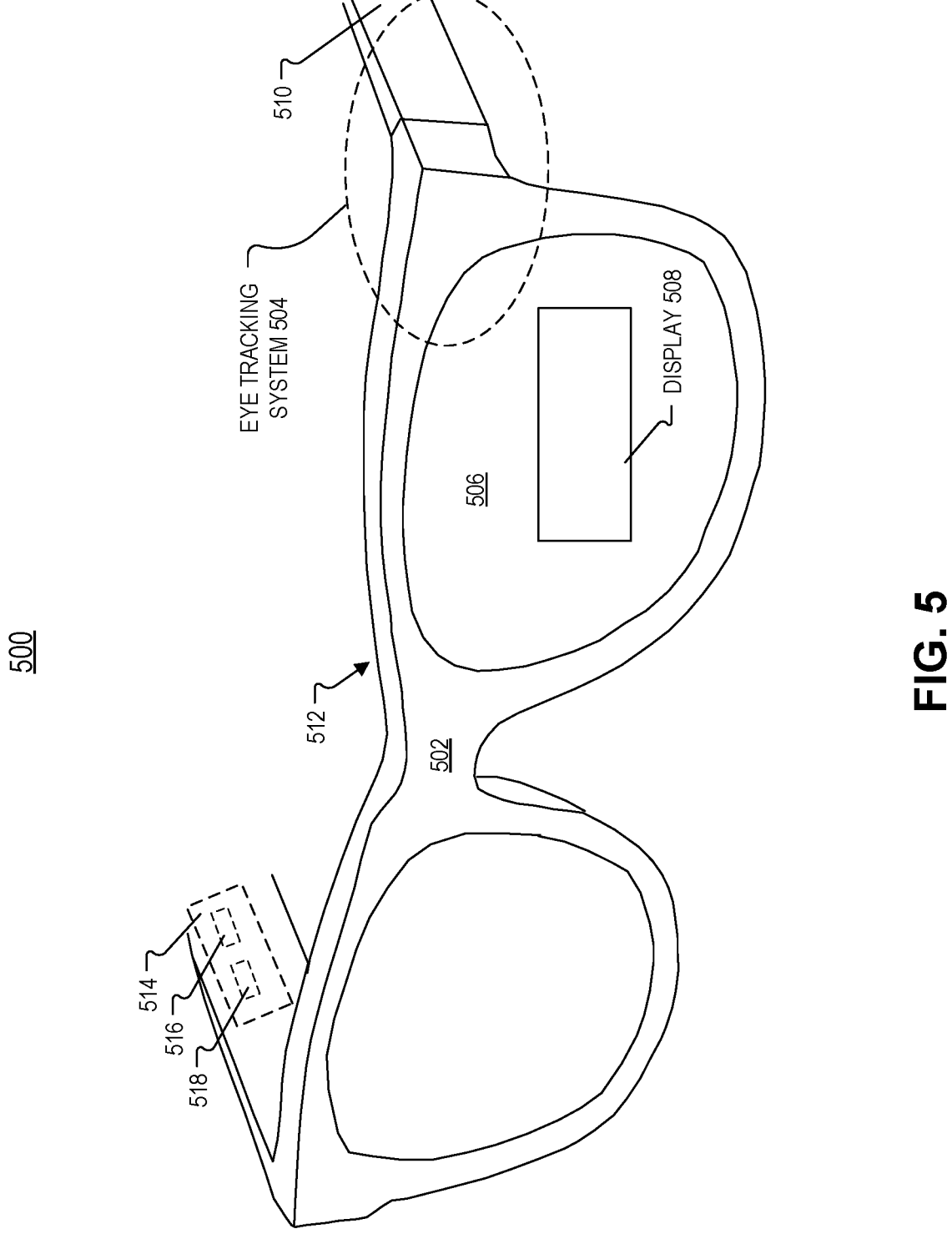
FIG. 5 illustrates a perspective view of an example of a head-mounted device, in accordance with aspects of the disclosure.

FIG. 5 illustrates a perspective view of an example of a head-mounted device 500, in accordance with aspects of the disclosure. Head-mounted device 500 is an example implementation of head-mounted device 100 (shown in FIG. 1A). Head-mounted device 500 may include a frame 502, an eye tracking system 504, a lens assembly 506, and a display 508, in accordance with aspects of the disclosure. Frame 502 is an illustrative example of frame 136 (shown in FIG. 1A). Eye tracking system 504 may be implemented into various locations of frame 502, such as within an arm 510 or a front portion 512 of frame 502. For example, a light source, a scanning mirror, and/or a detector array may be incorporated into arm 510 and/or into the top, side, middle, or bottom of front portion 512. Lens assembly 506 is an example implementation of lens assembly 138 (shown in FIG. 1A). Display 508 may be integrated into or positioned onto lens assembly 506. Display 508 may be integrated into a display layer of a stack of optical layers that define lens assembly 506. Head-mounted device 500 may also include a controller 514 having processing logic 516 and memory 518, according to an embodiment. Processing logic 516 may include processing logic 132 (shown in FIG. 1A), and memory 518 may store instructions that, when executed, perform one or more algorithms, processes, methods, or operations disclosed herein, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., processing logic 132) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memory 518) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye tracking system for a head-mounted device comprising:

a detector array positioned on the head-mounted device to receive reflected light from an eyebox region of the head-mounted device;

a scanning mirror optically coupled between the eyebox region and the detector array, wherein the scanning mirror is configured to rotate to direct the reflected light from a plurality of locations within the eyebox region to the detector array;

a light source configured to provide pulses of light to illuminate at least part of the eyebox region; and processing logic coupled to the detector array and configured to receive light detection data, wherein the processing logic is configured to determine an orientation or depth characteristic of an eye based at least partially on a travel duration of the pulses of light between the light source, the eyebox region, and the detector array.

2. The eye tracking system of claim 1, further comprising:

processing logic coupled to the detector array to receive light detection data, wherein the processing logic is configured to determine an orientation of an eye in the eyebox region based on the light detection data, wherein the detector array includes a plurality of pixels, wherein the light detection data is based on ones of the plurality of pixels in the detector array that receive the reflected light, wherein the orientation of the eye is determined based on a distance traveled by the reflected light, wherein the distance traveled by the reflected light is at least partially determined based on a location of the ones of the plurality of pixels that receive the reflected light.

3. The eye tracking system of claim 2, wherein the scanning mirror rotates along a first axis to direct the pulses of light to a plurality of locations within the eyebox region, wherein the scanning mirror directs the reflected light from the plurality of locations onto the detector array, wherein the distance traveled by the reflected light is at least partially determined based on an angle of the scanning mirror.

4. The eye tracking system of claim 1, wherein the scanning mirror is configured to rotate 50-70 degrees per period to direct the reflected light from the eyebox region to the detector array, wherein the scanning mirror is configured to rotate 50-70 degrees per period to direct the pulses of light from the light source to the eyebox region.

5. The eye tracking system of claim 1 further comprising:

a beam splitter optically coupled between the light source, the detector array, and the scanning mirror, wherein the beam splitter directs the pulses of light from the light source into a light path that is coaxial with the reflected light, wherein the beam splitter passes the reflected light to the detector array.

6. The eye tracking system of claim 5, wherein the beam splitter is a polarization beam splitter configured to redirect a first polarization orientation of the pulses of light and configured to transmit a second polarization orientation of the reflected light.

7. The eye tracking system of claim 5, wherein the beam splitter is a 50-50 beam splitter having a surface that redirects some of the pulses of light and that transmits some of the reflected light.

8. The eye tracking system of claim 1, wherein a duration of each of the pulses of light are shorter than 1 ns in duration.

9. The eye tracking system of claim 1, wherein the light source is a laser, a light emitting diode (LED), superluminescent diode (SLED), an edge emitting LED, or a vertical cavity surface emitting laser (VCSEL).

10. The eye tracking system of claim 1, wherein the detector array is a two-dimensional (2D) array having rows and columns of pixels.

11. The eye tracking system of claim 1, wherein a scanning frequency includes a rate of 10 kHz to 100 kHz, wherein a range of scanning angles is 55-65°.

12. The eye tracking system of claim 1, wherein the light source, the scanning mirror, and the detector array operate together to provide 0.1 to 0.2 degrees of optical resolution.

13. A head-mounted device comprising:

a frame configured to be worn about a head of a user;

a lens assembly carried by the frame; and an eye tracking system comprising:

a detector array positioned on the head-mounted device to receive reflected light from an eyebox region of the head-mounted device;

a scanning mirror optically coupled between the eyebox region and the detector array, wherein the scanning mirror is configured to rotate to direct the reflected light from a plurality of locations within the eyebox region to the detector array;

a light source configured to provide pulses of light to illuminate at least part of the eyebox region; and processing logic coupled to the detector array and configured to receive light detection data, wherein the processing logic is configured to determine an orientation or depth characteristic of an eye based at least partially on a travel duration of the pulses of light between the light source, the eyebox region, and the detector array.

14. The head-mounted device of claim 13, wherein the eye tracking system further comprises:

processing logic coupled to the detector array to receive light detection data, wherein the processing logic is configured to determine an orientation of an eye in the eyebox region based on the light detection data, wherein the detector array includes a plurality of pixels, wherein the light detection data is based on ones of the plurality of pixels in the detector array that receive the reflected light, wherein the orientation of the eye is determined based on a distance traveled by the reflected light, wherein the distance traveled by the reflected light is at least partially determined based on a location of the ones of the plurality of pixels that receive the reflected light.

15. The head-mounted device of claim 13, wherein a range of scanning angles includes 50-70 degrees per period to direct the reflected light from the eyebox region to the detector array, wherein the scanning mirror is configured to rotate with the range of scanning angles per period to direct the pulses of light from the light source to the eyebox region.

16. The head-mounted device of claim 13, wherein a eyebox scanning frequency includes a frequency in a range of 10 kHz to 100 KHz.

17. A method of eye tracking with a head-mounted device comprising:

emitting pulses of light from a light source;

rotating a scanning mirror at an eyebox scanning frequency within a range of scanning angles;

directing, with the scanning mirror, the pulses of light from the light source towards an eye in an eyebox region;

directing, with the scanning mirror, light reflections from the eye to a detector array, wherein the detector array includes a plurality of pixels;

providing, with the detector array, light detection data that is representative of ones of the plurality of pixels that received light reflections in the detector array; and determining, with processing logic, depth characteristics of the eye based on the light detection data, wherein the depth characteristics are determined at least partially based on a travel duration of the pulses of light between the light source, the eyebox region, and the detector array.

18. The method of eye tracking of claim 17 further comprising:

applying the depth characteristics to a machine learning model; and determining an orientation of the eye based on an output of the machine learning model.

19. The method of eye tracking of claim 17, wherein the depth characteristics of the eye are determined based on an angular velocity of the scanning mirror and based on a scan direction of the scanning mirror.

20. The method of eye tracking of claim 17, wherein the scanning mirror scans the eyebox region at an angular velocity of 10 kHz to 100 KHz.

* * * * *